(12) United States Patent
Ou

(10) Patent No.: US 11,293,400 B2
(45) Date of Patent: Apr. 5, 2022

(54) FEEDFORWARD CONTROL METHOD AND DEVICE FOR WIND TURBINE SET IN WIND FARM

(71) Applicant: BEIJING GOLDWIND SCIENCE & CREATION WINDPOWER EQUIPMENT CO., LTD., Beijing (CN)

(72) Inventor: Fashun Ou, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/640,295

(22) PCT Filed: Aug. 13, 2018

(86) PCT No.: PCT/CN2018/100245
§ 371 (c)(1),
(2) Date: Feb. 19, 2020

(87) PCT Pub. No.: WO2019/165759
PCT Pub. Date: Sep. 6, 2019

(65) Prior Publication Data
US 2020/0291921 A1 Sep. 17, 2020

(30) Foreign Application Priority Data
Feb. 28, 2018 (CN) .......................... 201810165580.8

(51) Int. Cl.
*F03D 7/02* (2006.01)
*F03D 7/04* (2006.01)

(52) U.S. Cl.
CPC .......... *F03D 7/0224* (2013.01); *F03D 7/028* (2013.01); *F03D 7/048* (2013.01);
(Continued)

(58) Field of Classification Search
CPC ...... F03D 7/0224; F03D 7/0284; F03D 7/048; F03D 7/046; F03D 7/045; F03D 7/043;
(Continued)

(56) References Cited

U.S. PATENT DOCUMENTS

| 2007/0035135 A1* | 2/2007 | Yoshida ................. F03D 7/048 290/44 |
| 2013/0106107 A1* | 5/2013 | Spruce ................. F03D 7/0224 290/44 |

(Continued)

FOREIGN PATENT DOCUMENTS

| CN | 102518553 A | 6/2012 |
| CN | 107100794 A | 8/2017 |

(Continued)

OTHER PUBLICATIONS

International Search Report dated Nov. 28, 2018; PCT/CN2018/100245.

(Continued)

*Primary Examiner* — Tulsidas C Patel
*Assistant Examiner* — Joseph Ortega

(57) ABSTRACT

A feedforward control method for a wind turbine set in a wind farm, comprising: obtaining real-time operation data of a predetermined wind turbine set in a wind farm; inputting the acquired real-time operation data into a predetermined prediction model corresponding to the predetermined wind turbine set so as to acquire prediction data by means of the predetermined prediction model; according to the acquired prediction data, determining whether to start a feedforward control function for the predetermined wind turbine set so as to control the operation state of the predetermined wind turbine set on the basis of a predetermined manner of feedforward control. The method may control a wind turbine set in advance and is beneficial in the safe operation of wind turbine sets. The present invention also relates to a feedfor- (Continued)

ward control device for a wind turbine set in a wind farm, a control system, a computer readable storage medium and a field group controller.

17 Claims, 3 Drawing Sheets

(52) U.S. Cl.
CPC . *F05B 2260/821* (2013.01); *F05B 2270/1033* (2013.01); *F05B 2270/32* (2013.01); *F05B 2270/327* (2013.01); *F05B 2270/328* (2013.01); *F05B 2270/335* (2013.01)

(58) Field of Classification Search
CPC .............. F03D 7/0204; F05B 2260/821; F05B 2270/1033; F05B 2270/32; F05B 2270/327; F05B 2270/328; F05B 2270/335; F05B 2270/321; F05B 2270/322; Y02E 10/72
See application file for complete search history.

(56) References Cited

U.S. PATENT DOCUMENTS

| 2018/0003154 A1 | 1/2018 | Deshpande et al. |
| 2018/0034394 A1 | 2/2018 | Kakuya et al. |

FOREIGN PATENT DOCUMENTS

| CN | 107524572 A | 12/2017 |
| CN | 107559144 A | 1/2018 |
| EP | 3263890 A1 | 1/2018 |
| EP | 3276166 A1 | 1/2018 |

OTHER PUBLICATIONS

Extended European Search Report dated Apr. 17, 2020; Appln. No. 18907660.7.

* cited by examiner

FEEDFORWARD CONTROL METHOD AND DEVICE FOR WIND TURBINE SET IN WIND FARM

CROSS REFERENCE TO RELATED APPLICATIONS

This application is the national phase of International Patent Application No. PCT/CN2018/100245, titled "FEEDFORWARD CONTROL METHOD AND DEVICE FOR WIND TURBINE SET IN WIND FARM", filed on Aug. 13, 2018, which claims priority to Chinese Patent Application No. 201810165580.8, titled "FEEDFORWARD CONTROL METHOD AND DEVICE FOR WIND TURBINE IN WIND FARM", filed on Feb. 28, 2018 with the China National Intellectual Property Administration, both of which are incorporated herein by reference in their entireties.

FIELD

The present application generally relates to the technical field of wind power generation, and in particular to a feedforward control method and device for a wind turbine in a wind farm.

BACKGROUND

During normal operation of a wind turbine, an operation state thereof may change with an ambient wind speed, which may result in a change in the aerodynamic power applied to a blade. Based on a current operation state, a wind turbine control system may control the wind turbine to react accordingly, to achieve maximized capture of wind energy by the wind turbine. In this process, as the wind speed changes rapidly, it generally takes several control periods from generation of a control command by the wind turbine control system to finishing of an operation by an actuator after receiving the control command. However, the wind speed may have changed during the above control process, and there is a high probability of an over-speed fault or a sharp increase in the load of the wind turbine due to the hysteresis of the wind turbine control system and its actuator, which affects the safe operation and long-term fatigue load of the wind turbine.

SUMMARY

A feedforward control method and device for a wind turbine in a wind farm are provided according to the present disclosure, with which the wind turbine can be controlled in advance, thereby facilitating safe operation of the wind turbine.

In an aspect of exemplary embodiments of the present disclosure, a feedforward control method for a wind turbine in a wind farm is provided. The feedforward control method includes: obtaining real-time operation data of a predetermined wind turbine in a wind farm; inputting the obtained real-time operation data to a predetermined prediction model corresponding to the predetermined wind turbine, to obtain prediction data by the predetermined prediction model; and determining whether to enable a feedforward control function for the predetermined wind turbine based on the obtained prediction data to control an operation state of the predetermined wind turbine by predetermined means of feedforward control.

In another aspect of exemplary embodiments of the present disclosure, a feedforward control device for a wind turbine in a wind farm is provided. The feedforward control device includes a data obtaining module, a prediction module, and a feedforward control module. The data obtaining module is configured to obtain real-time operation data of a predetermined wind turbine in a wind farm. The prediction module is configured to input the obtained real-time operation data to a predetermined prediction model corresponding to the predetermined wind turbine to obtain prediction data by the predetermined prediction model. The feedforward control module is configured to determine whether to enable a feedforward control function for the predetermined wind turbine based on the obtained prediction data to control an operation state of the predetermined wind turbine by predetermined means of feedforward control.

In another aspect of exemplary embodiments of the present disclosure, a feedforward control system for a wind turbine in a wind farm is provided. The feedforward control system includes the above feedforward control device for a wind turbine in a wind farm.

In another aspect of exemplary embodiments of the present disclosure, a computer readable storage medium storing a computer program is provided. The computer program, when executed by a processor, configures the processor to perform the above feedforward control method for a wind turbine in a wind farm.

In another aspect of exemplary embodiments of the present disclosure, a wind farm group controller is provided. The wind farm group controller includes a processor and a memory storing a computer program. The computer program, when executed by a processor, configures the processor to perform the above feedforward control method for a wind turbine in a wind farm.

DETAILED DESCRIPTION OF EMBODIMENTS

Figure 1:
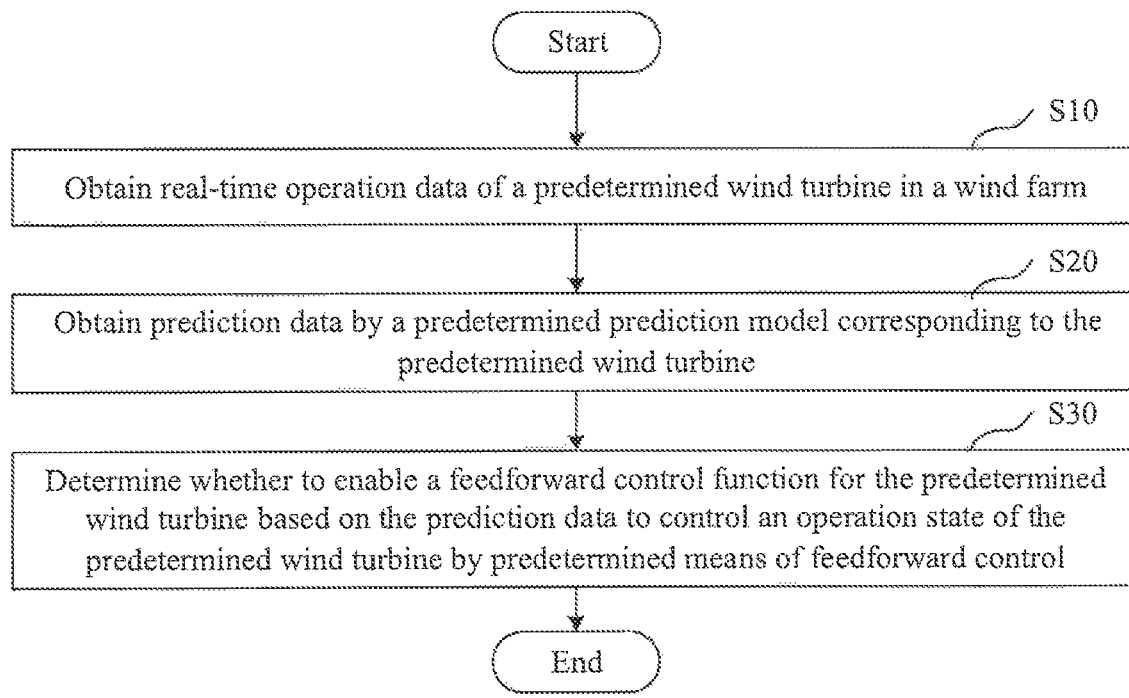
FIG. 1 is a flow chart of a feedforward control method for a wind turbine in a wind farm according to an exemplary embodiment of the present disclosure.

Exemplary embodiments of the present disclosure are described fully with reference to the drawings. Some exemplary embodiments are shown in the drawings.

FIG. 1 is a flow chart of a feedforward control method for a wind turbine in a wind farm according to an exemplary embodiment of the present disclosure. Preferably, the feedforward control method shown in FIG. 1 may be performed by a wind farm group controller at a wind farm. The wind farm group controller herein may refer to a wind farm controller (WFC, wind farm controller) for controlling all of the wind turbines in the wind farm, which may achieve customized and optimized control to the wind turbines, so as to increase the power generation capability of the wind farm.

Referring to FIG. 1, in step S10, real-time operation data of a predetermined wind turbine in a wind farm is obtained.

The obtained real-time operation data may include real-time wind parameters obtained when the wind turbine operates and real-time operation parameters of the predetermined wind turbine itself. For example, the obtained real-time operation data may be time sequence based real-time operation data, corresponding to a predetermined prediction model, of the predetermined wind turbine.

In step S20, the obtained real-time operation data is inputted into a predetermined prediction model corresponding to the predetermined wind turbine, to obtain prediction data by the predetermined prediction model. Preferably, the prediction data obtained by the predetermined prediction model may include a wind parameter and an operation parameter of the predetermined wind turbine itself.

Prediction data after a predetermined time period may be obtained by the predetermined prediction model. The predetermined time period may be a predetermined multiple of a minimum time period (for example, from a time when a control command is generated to a time when an operation corresponding to the control command is performed) required to control the predetermined wind turbine to perform an operation corresponding to means of feedforward control. For example, the predetermined time period may be in the order of seconds. That is, the predetermined prediction model may be used for short-period prediction. It is to be understood that the prediction time period of the predetermined prediction model may be related to a sampling period of training data for the predetermined prediction model, and the short the sampling period of the training data is, the shorter the prediction time period of the predetermined prediction model is.

In addition to short-period prediction, the predetermined prediction model in an exemplary embodiment of the present disclosure may also be used for a medium-long period (for example, ten-plus seconds, several tens of seconds, several minutes, ten-plus minutes) prediction. Prediction data in a medium-long period (for example, about ten minutes) may be obtained by the above described predetermined prediction model by using real-time operation data of the predetermined wind turbine in a medium-long sampling period (for example, about ten seconds), which may be used as supplementary data for a wind power prediction system in a longer period (for example, tens of minutes, several hours, and several days).

In step S30, it is determined whether to enable a feedforward control function for the predetermined wind turbine based on the obtained prediction data to control an operation state of the predetermined wind turbine by predetermined means of feedforward control.

The step of determining whether to enable the feedforward control function for the predetermined wind turbine based on the obtained prediction data may include: determining whether a prediction accuracy of the predetermined prediction model meets a requirement. In a case that the prediction accuracy of the predetermined prediction model meets the requirement, it is determined to enable the feedforward control function for the predetermined wind turbine, and in a case that the prediction accuracy of the predetermined prediction model does not meet the requirement, it is determined not to enable the feedforward control function for the predetermined wind turbine.

The step of determining whether the prediction accuracy of the predetermined prediction model meets the requirement may include: inputting obtained a predetermined amount of real-time operation data of a sampling period before a current time into the predetermined prediction model to obtain multiple prediction data of the predetermined sampling period; determining whether the multiple prediction data is consistent with multiple actually measured data corresponding to the multiple prediction data; and determining, if the multiple prediction data is consistent with the multiple actually measured data, that the prediction accuracy of the predetermined prediction model meets the requirement.

For example, it may be assumed that the current time is 10:00:00, and real-time operation data obtained before the current time (for example, real-time operation data obtained during a time period 09:59:54-09:59:56) may be inputted into the predetermined prediction model to obtain multiple predication data after a predetermined time period (for example, predication data during a time period 09:59:57-09:59:59). The multiple predication data during the time period 09:59:57-09:59:59 are compared with the multiple actually measured data which are obtained during the time period 09:59:57-09:59:59 and corresponding to the multiple prediction data. If the multiple predication data is consistent with the multiple actually measured data, it is determined that the prediction accuracy of the predetermined prediction model meets the requirement. It is to be understood that the actually measured data is corresponding to the obtained prediction data. That is, if the predicted data indicates a wind speed, the actually measured data also indicates the wind speed.

In addition, if the multiple predication data is not consistent with the multiple actually measured data, it indicates that the prediction accuracy of the predetermined prediction model does not meet the requirement. In this case, the predetermined prediction model may be trained online based on the obtained real-time operation data. After the predetermined prediction model is trained, it is again determined whether the prediction accuracy of the predetermined prediction model meets the requirement, such that the predetermined prediction model can be applied to feedforward control once the prediction accuracy of the predetermined prediction model meets the requirement.

The step of determining whether the multiple prediction data of the predetermined sampling period are consistent with the multiple actually measured data respectively corresponding to the multiple prediction data may include: calculating a mean absolute error or a mean absolute error percentage between the multiple prediction data of the predetermined sampling period and the multiple actually measured data respectively corresponding to the multiple prediction data. In a case that the mean absolute error is greater than a set threshold corresponding to the predetermined prediction model or the mean absolute error percentage is greater than a set percentage threshold corresponding to the predetermined prediction model, it is determined that the multiple prediction data is consistent with the corresponding multiple actually measured data, that is, the prediction accuracy of the predetermined prediction model meets the requirement. In a case that the mean absolute error is not greater than the set threshold corresponding to the predetermined prediction model or the mean absolute error percentage is not greater than the set percentage threshold corresponding to the predetermined prediction model, it is determined that the multiple prediction data is inconsistent with the corresponding multiple actually measured data, that is, the prediction accuracy of the predetermined prediction model does not meet the requirement.

In some embodiments, the mean absolute error (MAE, Mean Absolute Error) may be calculated according to the following equation:

$$MAE = \frac{1}{m}\sum_{j=1}^{m}|\hat{y}_j - y_j| \quad (1)$$

In equation (1), $y_j$ indicates actually measured data at the j-th data sampling point, $\hat{y}_j$ indicates prediction data at the j-th data sampling point, where $1 \leq j \leq m$, and m indicates the number of data sampling points in the predetermined sampling period.

In some embodiments, the mean absolute percentage error (MAPE, Mean Absolute Percentage Error) may be calculated according to the following equation:

$$MAPE = \frac{1}{m}\sum_{j=1}^{m}\left(\left|\frac{\hat{y}_j - y_j}{y_j}\right|\right) \times 100\% \quad (2)$$

It is to be understood that, in addition to the above ways of determining the prediction accuracy of the predetermined prediction model by calculating the mean absolute error MAE and the mean absolute error percentage MAPE, it may also be determined whether the prediction accuracy of the predetermined prediction model meets the requirement in other ways. For example, the prediction accuracy of the predetermined prediction model may be determined by calculating a standard deviation of mean absolute error (SDMAE), a standard deviation of mean absolute error percentage (SDMAPE).

In some embodiments, the predetermined prediction model may be trained online based on the obtained real-time operation data of the predetermined wind turbine, and in a case that the prediction accuracy of the predetermined prediction model meets the requirement, the predetermined prediction model is applied to perform feedforward control, to provide predication data required in feedforward control. It is to be appreciated that the predetermined prediction model may be trained by various conventional learning and training methods based on the obtained real-time operation data of the predetermined wind turbine.

It is to be understood that in addition to the above described way of training the predetermined prediction model online, the predetermined prediction model may also be trained offline. For example, the predetermined prediction model may be trained based on history operation data of the predetermined wind turbine, and the trained predetermined prediction model is tested. In a case that the prediction accuracy of the predetermined prediction model meets the requirement, the predetermined prediction model is applied to perform real-time online feedforward control described above. During the feedforward control process, the predetermined prediction model is tested continually online, to ensure a high prediction accuracy of the predicted model in the feedforward control process.

For example, the predetermined prediction model may include at least one of the following models: a wind speed prediction model, a wind direction prediction model, a turbulence intensity prediction model, and a power generator rotation speed prediction model.

In a first case, the predetermined prediction model may be one prediction model, and it may be determined whether to enable the feedforward control function for the predetermined wind turbine based on prediction data obtained by the prediction model to control the operation state of the predetermined wind turbine by predetermined means of feedforward control.

The determining whether to enable the feedforward control function for the predetermined wind turbine based on the prediction data may include: determining whether a change amount of the prediction data in a predetermined time period is greater than a set value; controlling, in a case that the change amount of the prediction data in the predetermined time period is greater than the set value, the operation state of the predetermined wind turbine is controlled by means of pitch control or electromagnetic torque control.

In a first example, the predetermined prediction model is the wind speed prediction model, and the real-time operation data obtained in step S10 corresponding to the wind speed prediction model may include: a real-time measured wind speed, a wind direction, a power generator rotation speed, an output power, and a power generator electromagnetic torque. Accordingly, the predication data obtained by the prediction model may indicate a predicted wind speed.

In order to improve accuracy in wind speed measurement, a hub front wind measurement system may be mounted on the predetermined wind turbine. Since the hub front wind measurement system may accurately measure a wind speed of wind flowing freely across an impeller plane at the hub in the predetermined wind turbine, the accuracy of wind speed prediction may be greatly improved by training the wind speed prediction model using the wind speed measured by the hub front wind measurement system, such that the feedforward control function is expanded. That is, the wind speed prediction model is not only used for feedforward control on the predetermined wind turbine in a case of a large turbulence, but also used for feedforward control on the predetermined wind turbine under a normal operation condition, such that the predetermined wind turbine operates as an active control system, thereby greatly improving an operation efficiency of the predetermined wind turbine and reducing a load under an extreme condition.

In addition, an anemometer tower may be mounted in a main wind direction of the predetermined wind turbine, and a wind speed measured by an anemometer of the predetermined wind turbine may be calibrated by using a wind speed measured by the anemometer tower, such that the wind speed measured by the anemometer is more accurate, thereby expanding the operation range of feedforward control, thus improving a capability of the predetermined wind turbine to perform active control. In this case, since the anemometer tower is fixedly mounted to the predetermined wind turbine and the predetermined wind turbine may rotate as the wind direction changes, the accuracy of the wind speed measured by the anemometer tower is lowered. That is, the wind speed measured by the anemometer may be calibrated by using the wind speed measured by the anemometer tower in a sector of predetermined range which is centered at the main wind direction of the predetermined wind turbine.

Hereinafter, description is made by taking a case that the predetermined prediction model is the wind speed prediction model and the prediction data is the predicted wind speed as an example, to describe steps of the feedforward control method with the wind speed predication model.

The step of determining whether to enable the feedforward control function for the predetermined wind turbine based on the obtained prediction data may include: determining whether a change amount of the predicted wind speed in a predetermined time period is greater than a set value (for example, a set change amount of wind speed). If the change amount of the predicted wind speed (which may be an increased amount of the predicted wind speed or a reduced amount of the predicted wind speed) is greater than the set value, the operation state of the predetermined wind turbine is controlled by means of pitch control or electromagnetic torque control.

If the change amount of the predicted wind speed is greater than the set value, it may be determined whether the predetermined wind turbine is in a full power generation state after the predetermined time period based on the predicted wind speed. For example, it may be determined whether the predetermined wind turbine is in a full power generation state based on a comparison result between the predicted wind speed and a rated wind speed. In a case that the predicted wind speed is not less than the rated wind speed, it may be determined that the predetermined wind turbine is in a full power generation state, and in a case that the predicted wind speed is less than the rated wind speed, it may be determined that the predetermined wind turbine is in a non-full power generation state.

If the predetermined wind turbine is in a full power generation state, the operation state of the predetermined wind turbine is controlled by means of pitch control. For example, in a case that the predicted wind speed is greater than the rated wind speed, it may be determined that the predetermined wind turbine is in a full power generation state. In this case, a constant power adjustment may be performed by means of pitch control. That is, the predetermined wind turbine may output a constant power by means of pitch control (which allows the wind turbine to output a rated power). For example, in a case that the increased amount of the predicted wind speed is greater than the set change amount of wind speed, if the predetermined wind turbine is in a full power generation state, the predetermined wind turbine may be controlled to increase a pitch angle. In a case that the reduced amount of the predicted wind speed is greater than the set change amount of wind speed, if the predetermined wind turbine is in a full power generation state, the predetermined wind turbine may be controlled to reduce the pitch angle.

If the predetermined wind turbine is in a non-full power generation state, the operation state of the predetermined wind turbine may be controlled by means of electromagnetic torque control. For example, in a case that the predicted wind speed is not greater than the rated wind speed, it may be determined that the predetermined wind turbine is in a non-full power state, that is, in the maximum wind energy capturing state. In this case, the pitch angle of a blade is maintained at an optimal pitch angle, and an electromagnetic torque of a power generator may be adjusted (for example, increasing the electromagnetic torque) by means of electromagnetic torque control to adjust a power generator rotation speed, to allow the blade to operate at an optimal tip speed ratio, such that the wind energy utilization coefficient (Cpmax) of the blade is maximum, thereby capturing maximum wind energy by the predetermined wind turbine, in a case that the increased amount of the predicted wind speed is greater than the set change amount of wind speed, if the predetermined wind turbine is in a non-full power generation state, the predetermined wind turbine is controlled to increase the electromagnetic torque. In a case that the reduced amount of the wind speed is greater than the set change amount of wind speed, if the predetermined wind turbine is in a non-full power state, the predetermined wind turbine is controlled to reduce the electromagnetic torque.

In a second example, the predetermined prediction model is the wind direction prediction model, and the real-time operation data obtained in step S10 corresponding to the wind direction prediction model may include: a real-time measured wind speed, a wind direction, a nacelle position, a power generator rotation speed, an output power, and a power generator electromagnetic torque.

In a third example, the predetermined prediction model is the turbulence intensity prediction model, and the real-time operation data obtained in step S10 corresponding to the turbulence intensity prediction model may include: a real-time measured wind speed, a wind direction, a power generator rotation speed, an output power, and a power generator electromagnetic torque.

In an embodiment of the present disclosure, a turbulence intensity is defined as a ratio of a wind speed standard deviation in a predetermined time period to an average wind speed in the predetermined time period, that is, the turbulence intensity indicates an estimated value in the predetermined time period. The turbulence intensity obtained by the turbulence intensity prediction model may be not used for feedforward control, but is only provided to an operator at the wind farm for the operator to know the change trend of the turbulence intensity.

In a fourth example, the predetermined prediction model is the power generator rotation speed prediction model, and the real-time operation data obtained in step S10 corresponding to the power generator rotation speed prediction model may include: a real-time measured wind speed, a wind direction, a power generator rotation speed, an output power, a power generator electromagnetic torque, and accelerations of the wind turbine in a first predetermined direction (X direction) and a second predetermined direction (Y direction). For example, the first predetermined direction may refer to a direction from the head to the tail of the wind turbine, and the second predetermined direction may refer to a direction perpendicular to the wind direction (for example, in a case that an operator at the operation site stands following the wind direction and facing the head, the direction from the left to the right of the operator may be defined as the second predetermined direction).

If a wind turbine in the wind farm has a power generator over-speed fault, it is generally impossible to reset the wind turbine to eliminate the power generator over-speed fault via remote control, therefore, the operator at the wind farm needs to operate at the operation site of the wind turbine to reset the wind turbine to eliminate the fault. This may take a long time period to eliminate the above power generator over-speed fault, resulting in a power loss. In some embodiments of the present disclosure, the power generator rotation speed may be predicted by the power generator rotation speed prediction model, and adjustment may be performed in advance based on the predicted power generator rotation speed by means of pitch control, thereby avoiding the power generator over-speed fault, thus reducing the power loss.

In a second case, the predetermined prediction model may include at least two prediction models. In this case, the feedforward control method for a wind turbine in a wind farm may further include: determining whether a comprehensive accuracy of the at least two prediction models meets a requirement.

The step of determining whether the comprehensive accuracy of the at least two prediction models meets the requirement may include: setting a weight for each of the at least two prediction models; determining the comprehensive accuracy based on the set weight and the prediction accuracy of each of the prediction models; determining that the comprehensive accuracy meets the requirement in a case that the comprehensive accuracy is greater than a preset threshold, and determining that the comprehensive accuracy does not meet the requirement in a case that the comprehensive accuracy is not greater than the preset threshold.

The comprehensive accuracy of the at least two predication models may be calculated according to the following equation:

$$Pall = w_1 \cdot p(f(x_1)) + w_2 \cdot p(f(x_2)_2) + \ldots + w_n \cdot p(f(x_n)) \tag{3}$$

In equation (3), $w_1$ indicates a weight corresponding to an i-th prediction model, $1 \leq i \leq n$, n indicates the number of wind turbines in the wind farm, where $w_1 + w_2 + \ldots + w_n = 1$, $p(f(x_i))$ indicates a prediction accuracy of the i-th prediction model, and $x_i$ indicates real-time operation data corresponding to the i-th prediction model, where $x_i$ may generally be a multi-dimensional time sequence array.

In addition, the step of determining whether the comprehensive accuracy of the at least two prediction models meets the requirement may include: determining a prediction accuracy of each of the prediction models; and determining that the comprehensive accuracy meets the requirement in a case that the prediction accuracy of each of the prediction models meets the requirement.

In a case that the comprehensive accuracy of the at least two prediction models meets the requirement, it may be determined to enable the feedforward control function for the predetermined wind turbine. In a case that the comprehensive accuracy of the at least two prediction models does not meet the requirement, it may be determined not to enable the feedforward control function for the predetermined wind turbine.

Taking yaw control for example, the yaw control needs a wind speed and a wind direction to determine a yaw angle, to control the wind turbine to rotate by the determined yaw angle, thereby achieving alignment for wind. In a case that the predetermined prediction model includes the wind speed prediction model and the wind direction prediction model, the yaw angle is determined based on the wind speed obtained by the wind speed prediction model and the wind direction obtained by the wind direction prediction model, so as to control the predetermined wind turbine to rotate by the yaw angle by means of yaw control.

Figure 2:
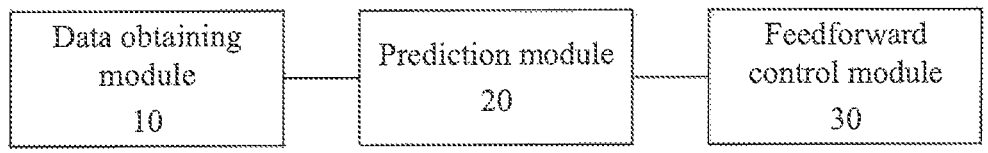
FIG. 2 is a structural diagram of a feedforward control device for a wind turbine in a wind farm according to an exemplary embodiment of the present disclosure.

FIG. 2 is a structural diagram of a feedforward control device for a wind turbine in a wind farm according to an exemplary embodiment of the present disclosure.

As shown in FIG. 2, a feedforward control device 100 for a wind turbine in a wind farm according to the exemplary embodiment of the present disclosure includes a data obtaining module 10, a prediction module 20, and a feedforward control module 30.

The data obtaining module 10 is configured to obtain real-time operation data of a predetermined wind turbine in a wind farm. The obtained real-time operation data may include a real-time wind parameter and a real-time operation parameter of the predetermined wind turbine itself when the wind turbine operates. For example, the obtained real-time operation data may be time sequence based real-time operation data, corresponding to a predetermined prediction model, of the predetermined wind turbine.

The prediction module 20 is configured to input the obtained real-time operation data into a predetermined prediction model corresponding to the predetermined wind turbine, to obtain prediction data by the predetermined prediction model. For example, the prediction data obtained by the predetermined prediction model may include a wind parameter and an operation parameter of the predetermined wind turbine itself.

The prediction module 20 may also be configured to obtain prediction data after a predetermined time period by the predetermined prediction model. The predetermined time period may be a predetermined multiple of a minimum time period required to control the predetermined wind turbine to perform an operation corresponding to means of feedforward control.

The feedforward control module 30 is configured to determine whether to enable a feedforward control function for the predetermined wind turbine based on the obtained prediction data, to control an operation state of the predetermined wind turbine by predetermined means of feedforward.

In some embodiments, the feedforward control device for a wind turbine in a wind farm may further include a test module (not shown in the drawings) configured to determine whether a prediction accuracy of the predetermined prediction model meets a requirement.

For example, the test module is configured to: input obtained real-time operation data in a predetermined sampling period (which may indicates a predetermined sampling period before the current time) into the predetermined prediction model to obtain multiple prediction data of the predetermined sampling period; determine whether the multiple prediction data is consistent with multiple actually measured data corresponding to the multiple prediction data; and determine, if the multiple prediction data is consistent with the multiple actually measured data, that the prediction accuracy of the predetermined prediction model meets the requirement. In a case that the prediction accuracy of the predetermined prediction model meets the requirement, the feedforward control module 30 determines to enable the feedforward control function for the predetermined wind turbine, and in a case that the prediction accuracy of the predetermined prediction model does not meet the requirement, the feedforward control module 30 determines not to enable the feedforward control function for the predetermined wind turbine.

If the multiple prediction data is inconsistent with the multiple actually measured data, it is determined that the prediction accuracy of the predetermined prediction model does not meet the requirement. In this case, the test module may train the predetermined prediction model online based on the obtained real-time operation data, and determine again whether the prediction accuracy of the predetermined prediction model meets the requirement after training the predetermined prediction model, such that the predetermined prediction model can be applied to perform feedforward control once the prediction accuracy of the predetermined prediction model meets the requirement.

For example, the test module may calculate a mean absolute error or a mean absolute error percentage between the multiple prediction data in the predetermined sampling period and the multiple actually measured data respectively corresponding to the multiple prediction data. If the mean absolute error is greater than a set threshold corresponding to the predetermined prediction model or the mean absolute error percentage is greater than a set percentage threshold corresponding to the predetermined prediction model, the test module determines that the multiple prediction data is consistent with the corresponding multiple actually measured data, that is, the prediction accuracy of the predetermined prediction model meets the requirement. If the mean absolute error is not greater than the set threshold corresponding to the predetermined prediction model or the mean absolute error percentage is not greater than the set percentage threshold corresponding to the predetermined prediction model, the test module determines that the multiple prediction data is inconsistent with the corresponding multiple actually measured data, that is, the prediction accuracy of the predetermined prediction model does not meet the requirement.

In some embodiments, the above predetermined prediction model may be trained online based on the obtained real-time operation data of the predetermined wind turbine, or may be trained offline based on history operation data of the predetermined wind turbine.

For example, the predetermined prediction model may include at least one of the following models: a wind speed prediction model, a wind direction prediction model, a turbulence intensity prediction model, and a power generator rotation speed prediction model.

In a first case, the predetermined prediction model may be one prediction model, and the feedforward control module 30 may determine whether to enable the feedforward control function for the predetermined wind turbine based on the prediction data obtained by the prediction model to control the operation state of the predetermined wind turbine by predetermined means of feedforward control.

The feedforward control module 30 determines whether a change amount of the prediction data in a predetermined time period is greater than a set value. If the change amount of the prediction data is greater than the set value, the feedforward control module 30 determines to enable the feedforward control function for the predetermined wind turbine, to control the operation state of the predetermined wind turbine by means of pitch control or electromagnetic torque control.

A feedforward control system for a wind turbine in a wind farm is further provided according to an exemplary embodiment of the present disclosure. The feedforward control system may further include multiple wind turbine controllers 200 in addition to the feedforward control device 100 shown in FIG. 2. Each wind turbine controller 200 may be configured to control an operation state of a corresponding wind turbine. In this case, if the feedforward control module 30 determines to enable the feedforward control function for the predetermined wind turbine, a wind turbine controller 200 corresponding to the predetermined wind turbine may control the operation state of the predetermined wind turbine by means of pitch control or electromagnetic torque control.

In a first example, the predetermined prediction model is the wind speed prediction model, and the real-time operation data corresponding to the wind speed prediction model obtained by the data obtaining module 10 may include: a real-time measured wind speed, a wind direction, a power generator rotation speed, an output power, and a power generator electromagnetic torque. Accordingly, the predication data obtained by the prediction model may indicate a predicted wind speed.

Hereinafter, description is made by taking a case that the predetermined prediction model is the wind speed prediction model and the prediction data is the predicted wind speed as an example, to describe a feedforward control process with the wind speed prediction model with reference to FIG. 2.

Figure 3:
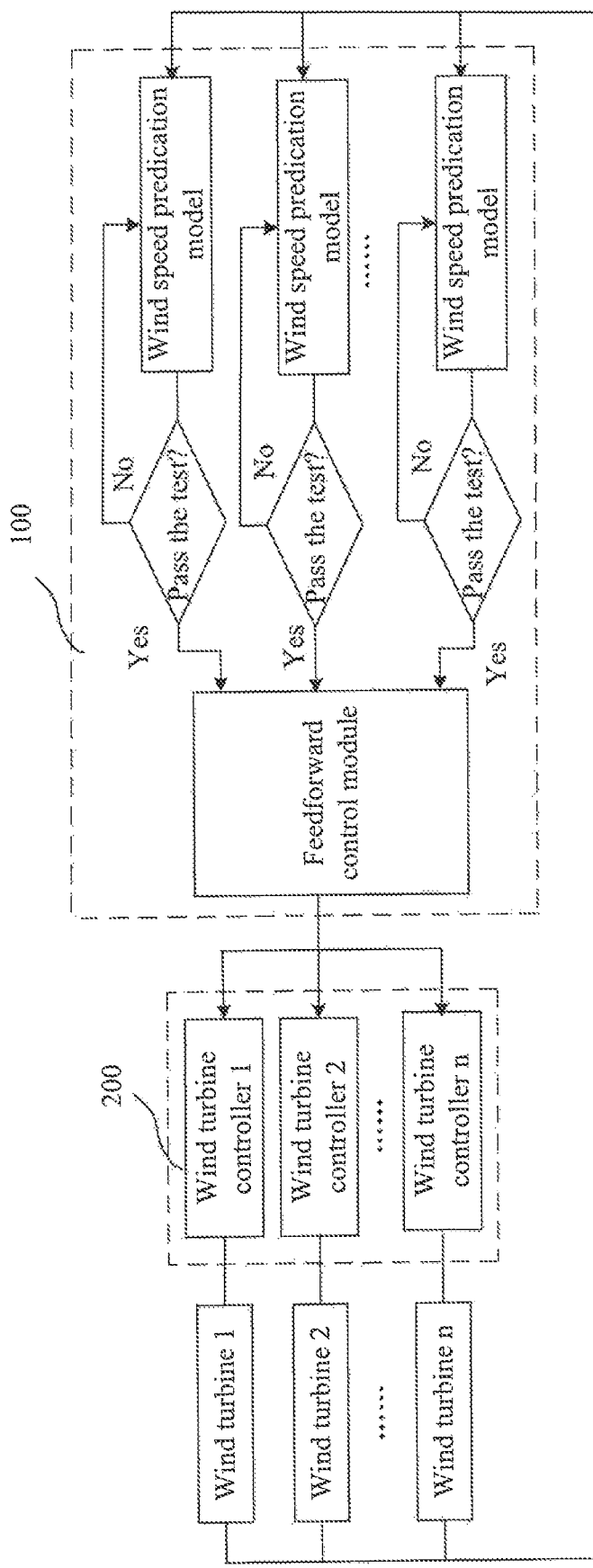
FIG. 3 is a schematic diagram showing a feedforward control process with a wind speed prediction model according to an exemplary embodiment of the present disclosure.

FIG. 3 is a schematic diagram showing a feedforward control process with a wind speed prediction model according to an exemplary embodiment of the present disclosure.

As shown in FIG. 3, it is assumed that n wind turbines are arranged in the wind farm, each of which is provided with a wind turbine controller and corresponds to one wind speed prediction model, in this case, the feedforward control device 100 in the above exemplary embodiment of the present disclosure as shown in FIG. 2 may include: a data obtaining module corresponding to each of the wind turbines, a prediction module and a test module corresponding to each prediction model, and a feedforward control module.

Specifically, taking the wind turbine 1 as an example, the feedforward control process with the wind speed prediction model may be implemented as follows. A data obtaining module 1 obtains a real-time wind speed when the wind turbine 1 operates, a prediction module 1 inputs the obtained real-time wind speed when the wind turbine 1 operates into a wind speed prediction model 1 corresponding to the wind turbine 1, to obtain a predicted wind speed for the wind turbine 1. A test module 1 determines whether a prediction accuracy of the wind speed prediction model 1 meets a requirement. In a case that the prediction accuracy of the wind speed prediction model 1 meets the requirement, the test module 1 transmits an enabling signal to the feedforward control module, and the feedforward control module determines to enable the feedforward control function for the wind turbine 1 in response to the enabling signal and transmits a control command in advance to the wind turbine controller 1 based on the predicted wind speed obtained by the wind speed prediction model 1. The wind turbine controller 1 adjusts an electromagnetic torque or changes a pitch in advance in response to the control command.

If the test module 1 determines that the prediction accuracy of the wind speed prediction model 1 does not meet the requirement, the test module 1 transmit no enabling signal to the feedforward control module, and the feedforward control module determines not to enable the feedforward control function for the wind turbine 1. In this case, the wind speed prediction model 1 needs to learn further to adapt to the current wind condition. In this case, the real-time operation data of the wind turbine 1 may be obtained in real time, and the wind speed prediction module 1 corresponding to the wind turbine 1 is trained online in real time. The test module 1 performs real-time testing, and transmits an enabling signal to the feedforward control module in a case of determining that the prediction accuracy of the wind speed prediction model 1 meets the requirement.

Since wind speed prediction models are built for individual wind turbines, that is, the difference between different wind turbines is considered, the feedforward control module may input different control parameters respectively to the wind turbine controllers, to avoid an over-speed fault on the wind turbines or to reduce a load on each of the wind turbines by varying the pitch in advance, thereby leading to a high efficiency and a small load of the wind turbine.

The feedforward control module 30 may determine whether a change amount of the predicted wind speed in a predetermined time period is greater than a set value (for example, a set change amount of wind speed). If the change amount of the predicted wind speed (which may be an increased amount of the predicted wind speed or an reduced amount of the predicted wind speed) is greater than the set value, the wind turbine controller corresponding to the predetermined wind turbine may control the operation state of the predetermined wind turbine by means of pitch control or the electromagnetic torque control.

Specifically, if the change amount of the predicted wind speed is greater than the set value, the feedforward control module 30 may determine whether the predetermined wind turbine is in a full power generation state after the predetermined time period based on the predicted wind speed. Here, the feedforward control module 30 may determine whether the predetermined wind turbine is in a full power generation state based on a comparison result between the predicted wind speed and a rated wind speed. In a case that the predicted wind speed is not less than the rated wind speed, the feedforward control module 30 may determine that the predetermined wind turbine is in a full power generation state, and in a case that the predicted wind speed is less than the rated wind speed, the feedforward control module 30 may determine that the predetermined wind turbine is in a non-full power generation state.

If the predetermined wind turbine is in a full power generation state, the feedforward control module 30 may determine to enable the feedforward control function for the predetermined wind turbine, and determine pitch control as the current means of feedforward control. In this case, the wind turbine controller corresponding to the predetermined wind turbine may control the operation state of the predetermined wind turbine by means of pitch control. In a case that the predicted wind speed is greater than the rated wind speed, it may be determined that the predetermined wind turbine is in a full power generation state. In this case, the wind turbine controller corresponding to the predetermined wind turbine may perform a constant power adjustment by means of pitch control. That is, the predetermined wind turbine may output at constant power under control in the pitch manner (which allows the wind turbine to output a rated power). In a case that the increased amount of the predicted wind speed is greater than the set change amount of wind speed, if the predetermined wind turbine is in a full power generation state, the wind turbine controller corresponding to the predetermined wind turbine may control the predetermined wind turbine to increase a pitch angle. In a case that the reduced amount of the predicted wind speed is greater than the set change amount of wind speed, if the predetermined wind turbine is in a full power generation state, the wind turbine controller corresponding to the predetermined wind turbine may control the predetermined wind turbine to reduce the pitch angle.

If the predetermined wind turbine is in a non-full power generation state, the feedforward control module 30 may determine to enable the feedforward control function for the predetermined wind turbine, and determine electromagnetic torque control as the current means of feedforward control. In this case, the wind turbine controller corresponding to the predetermined wind turbine may control the operation state of the predetermined wind turbine by means of electromagnetic torque control. Here, in a case that the predicted wind speed is not greater than the rated wind speed, it may be determined that the predetermined wind turbine is in a non-full power generation state, that is, in a maximum wind energy capturing state. In this case, the pitch angle of a blade is maintained at an optimal pitch angle, and the wind turbine controller corresponding to the predetermined wind turbine may adjust an electromagnetic torque (for example, increasing the electromagnetic torque) of a power generator by means of electromagnetic torque control to adjust a power generator rotation speed, to allow the blade to generate at an optimal tip speed ratio, such that the wind energy utilization coefficient of the blade is maximum, thereby capturing maximum wind energy by the predetermined wind turbine. For example, in a case that the increased amount of the predicted wind speed is greater than the set change amount of wind speed, if the predetermined wind turbine is in a non-full power generation state, the wind turbine controller corresponding to the predetermined wind turbine may control the predetermined wind turbine to increase an electromagnetic torque. In a case that the reduced amount of the predicted wind speed is greater than the set change amount of wind speed, if the predetermined wind turbine is in a non-full power generation state, the wind turbine controller corresponding to the predetermined wind turbine may control the predetermined wind turbine to reduce the electromagnetic torque.

In a second example, the predetermined prediction model is the wind direction prediction model, and the real-time operation data obtained by the data obtaining module 10 corresponding to the wind direction prediction model may include: a real-time measured wind speed, a wind direction, a nacelle position, a power generator rotation speed, an output power, and a power generator electromagnetic torque.

In a third example, the predetermined prediction model is the turbulence intensity prediction model, and the real-time operation data obtained by the data obtaining module 10 corresponding to the turbulence intensity prediction model may include: a real-time measured wind speed, a wind direction, a power generator rotation speed, an output power, and a power generator electromagnetic torque.

In an embodiment of the present disclosure, a turbulence intensity is defined as a ratio of a wind speed standard deviation in a predetermined time period to an average wind speed in the predetermined time period, that is, the turbulence intensity indicates an estimated value in the predetermined time period. The turbulence intensity predicted by the turbulence intensity prediction model may be not used for feedforward control, but is only provided to an operator at the wind farm for the operator to know the change trend of the turbulence intensity.

In this case, the feedforward control system for a wind turbine in a wind farm according to an exemplary embodiment of the present disclosure may further include: a display configured to display the prediction data obtained by using the predetermined prediction model. The feedforward control module may transmit the turbulence intensity obtained by the turbulence intensity prediction model to the display for display.

In a fourth example, the predetermined prediction model is the power generator rotation speed prediction model, and the real-time operation data obtained by the data obtaining module 10 corresponding to the power generator rotation speed prediction model may include: a real-time measured wind speed, a wind direction, a power generator rotation speed, an output power, a power generator electromagnetic torque, and accelerations of the wind turbine in a first predetermined direction (X direction) and a second predetermined direction (Y direction).

If a wind turbine in the wind farm has a power generator over-speed fault, it is generally impossible to reset the wind turbine to eliminate the power generator over-speed fault via remote control, therefore, the operator at the wind farm needs to operate at the operation site of the wind turbine to reset the wind turbine to eliminate the fault. This may take a long time period to eliminate the above power generator over-speed fault, resulting in a power loss. Therefore, in an exemplary embodiment of the present disclosure, the power generator rotation speed may be predicted by the power generator rotation speed prediction model, and a wind turbine controller for the wind turbine corresponding to the power generator rotation speed predication model may perform an adjustment in advance by means of pitch control based on the predicted power generator rotation speed, thereby avoiding the power generator over-speed fault, thus reducing the power loss.

In a second case, the predetermined prediction model may include at least two prediction models. A feedforward control process with the at least two prediction models is described below with reference to FIG. 4.

Figure 4:
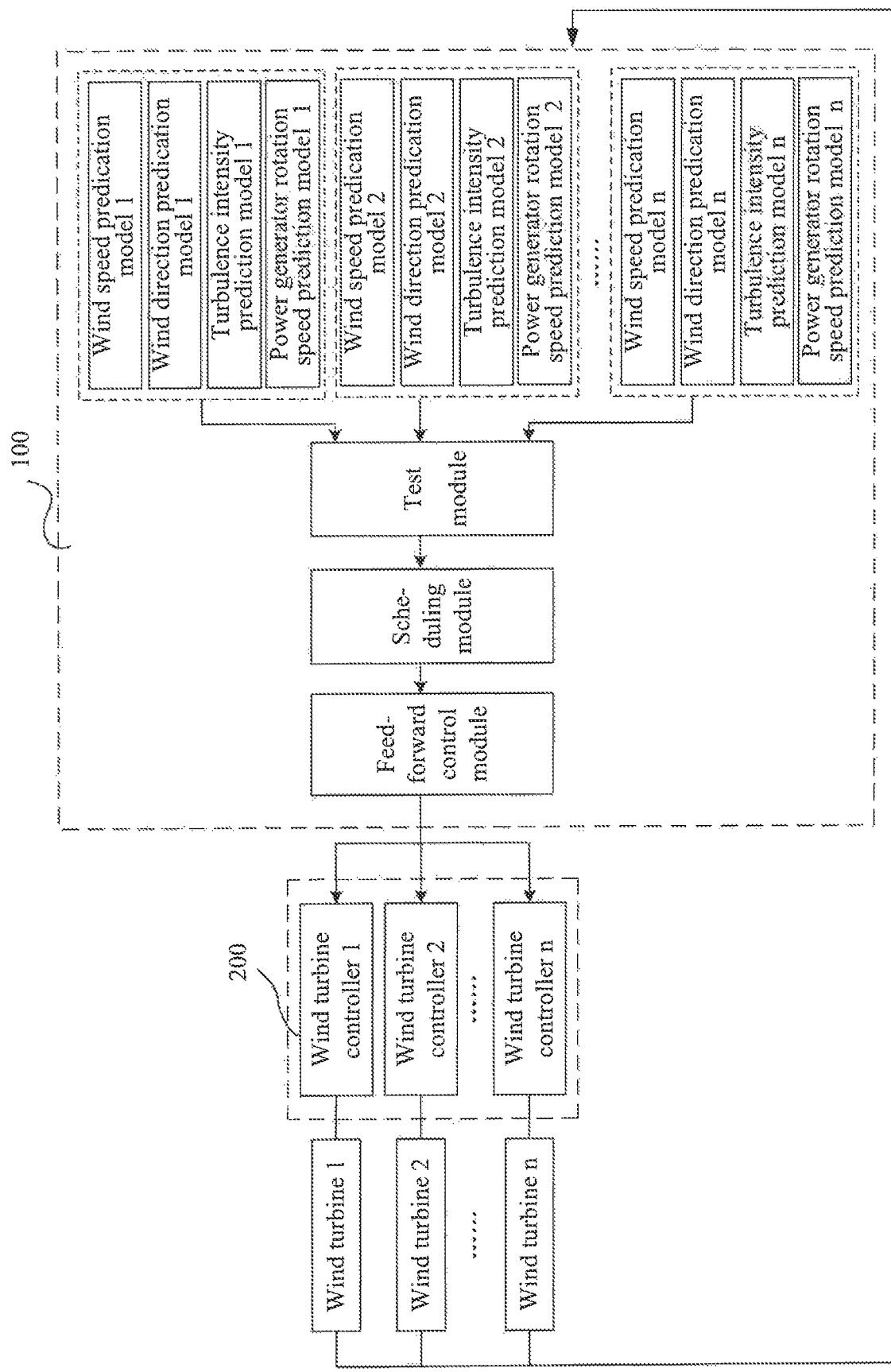
FIG. 4 is a schematic diagram showing a feedforward control process with at least two prediction models according to an exemplary embodiment of the present disclosure.

FIG. 4 is a schematically diagram showing a feedforward control process with at least two prediction models according to an exemplary embodiment of the present disclosure.

As shown in FIG. 4, it is assumed that n wind turbines are arranged in the wind farm, each of which is provided with a wind turbine controller and corresponds to one wind speed prediction model. The feedforward control device 100 shown in FIG. 2 may include: a data obtaining module corresponding to each of the wind turbines, a prediction module, a test module and a scheduling module corresponding to each of the prediction models, and a feedforward control module.

Specifically, the test module may be configured to determine whether a prediction accuracy of a prediction model corresponding to each of the wind turbines meets a requirement.

The scheduling module may be configured to determine whether a comprehensive accuracy of at least two prediction models meets the requirement.

In an example, the scheduling module may set a weight for each of the at least two prediction models, and determine the comprehensive accuracy based on the set weight and the prediction accuracy of each of the prediction models. In a case that the comprehensive accuracy is greater than a preset threshold, the scheduling module determines that the comprehensive accuracy meets the requirement, and in a case that the comprehensive accuracy is not greater than the preset threshold, the scheduling module determines that the comprehensive accuracy does not meet the requirement.

In another example, the scheduling module determines that the comprehensive accuracy meets the requirement in a case that the prediction accuracy of each of the prediction models meets the requirement.

In a case that the scheduling module determines that the comprehensive accuracy of the at least two prediction models meets the requirement, the scheduling module transmits an enabling signal to the feedforward control module, and the feedforward control module determines, in response to the enabling signal, to enable the feedforward control function for the predetermined wind turbine.

In a case that the scheduling module determines that the comprehensive accuracy of the at least two prediction models does not meet the requirement, the scheduling module transmit no enabling signal to the feedforward control module, and the feedforward control module determines not to enable the feedforward control function for the predetermined wind turbine. In this case, it is required to further train the at least two prediction models.

Taking yaw control for example, the yaw control needs a wind speed and a wind direction to determine a yaw angle, to control the wind turbine to rotate by the determined yaw angle, thereby achieving alignment for wind. In a case that the predetermined prediction model includes the wind speed predication model and the wind direction prediction model, if a comprehensive accuracy of the wind speed predication model and the wind direction prediction model meets the requirement, the feedforward control module determines the yaw angle based on the wind speed obtained by the wind speed predication model and the wind direction obtained by the wind direction prediction model, and the wind turbine controller corresponding to the predetermined wind turbine controls the predetermined wind turbine to rotate by the determined yaw angle by means of yaw control.

A computer readable storage medium storing a computer program is further provided according to an exemplary embodiment of the present disclosure. The computer-readable storage medium stores a computer program, which, when executed by a processor, configures the processor to perform the above feedforward control method for a wind turbine in a wind farm. The computer readable storage medium may be any data storage device that can store data readable by a computer system. Examples of the computer readable storage medium include: a read only memory, a random access memory, a read only optical disk, a magnetic tape, a floppy disk, an optical data storage device, and a carrier wave (such as data transmission through the Internet via a wired or wireless transmission path).

A wind farm group controller is further provided according to an exemplary embodiment of the present disclosure. The wind farm group controller includes a processor and a memory. The memory is configured to store a computer program. The computer program, when executed by the processor, configures the processor to perform the above feedforward control method for a wind turbine in a wind farm.

With the feedforward control method and device for a wind turbine in a wind farm according to the exemplary embodiments of the present disclosure, a future operation state of a wind turbine can be predicted to perform control in advance, thereby avoiding the impact of an extreme condition on the safe operation and the load of the wind turbine.

In addition, with the feedforward control method and device for a wind turbine in a wind farm according to the exemplary embodiments of the present disclosure, feedforward control and prediction data are combined, to turn a wind turbine control system from a passive control system into an active control system to some extent. The wind turbine control system can detect changes of the wind speed, the wind direction, the power generator rotation speed, and the turbulence intensity in advance, and generate corresponding control commands in advance, thereby eliminating the hysteresis of control by the conventional passive wind turbine control system, which is the basis for intelligent control on a single wind turbine.

In addition, with the feedforward control method and device for a wind turbine in a wind farm according to the exemplary embodiments of the present disclosure, an actual output of the wind turbine is improved, and the over-speed or over-acceleration fault of the wind turbine is avoided.

In addition, with the feedforward control method and device for a wind turbine in a wind farm according to the exemplary embodiments of the present disclosure, a large turbulence condition is predicted, such that a control command (for example, increasing an electromagnetic torque) is transmitted to the wind turbine in advance, to achieve a balance between the electromagnetic torque and an aerodynamic torque, thereby avoiding a sharp increase in a rotational speed of the wind turbine, improving the actual output of the wind turbine while avoiding the over-speed fault, and reducing the load on the wind turbine.

In addition, with the feedforward control method and device for a wind turbine in a wind farm according to the exemplary embodiments of the present disclosure, in a case that the wind turbine is in a power generation state, a sharp increase in the wind speed is predicted by using the wind speed predication module, such that a load applied to the wind turbine due to the sharp increase in the wind speed is offset by varying the pitch in advance, thereby achieving a constant output power control of the wind turbine.

In addition, the wind speed and power prediction system currently used in China may perform predications with an interval of 10 to 20 minutes, that is, the wind speed and power prediction system predicts the wind speed and power in the wind farm every 10 to 20 minutes, to schedule a grid. In this case, the predetermined prediction model according to the above exemplary embodiments of the present disclosure may be used to perform a long-term prediction, for example, to predict the wind speed and power in a time period of 5 to 20 minutes, and use the predicted wind speed and power as supplementary data to the current wind speed and power prediction system.

Although is the present disclosure is illustrated and described with reference to the exemplary embodiments, it is to be understood by those skilled in the art that various modifications and variations may be made to these embodiments without departing from the spirit and the scope of the present disclosure defined by the appended claims.

The invention claimed is:

1. An enabling method of feedforward control for a wind turbine in a wind farm, which is performed by a wind farm controller, the method comprising:
    obtaining real-time operation data of a predetermined wind turbine in the wind farm;
    inputting the obtained real-time operation data into a predetermined prediction model corresponding to the predetermined wind turbine, to obtain prediction data by the predetermined prediction model; and
    determining whether to enable a feedforward control function for the predetermined wind turbine based on the obtained prediction data to control an operation state of the predetermined wind turbine by predetermined means of feedforward control,
    wherein determining whether to enable the feedforward control function for the predetermined wind turbine based on the obtained prediction data comprises:
    determining whether a change amount of the prediction data in a predetermined time period is greater than a set value;
    determining, in a case that the change amount of the prediction data in the predetermined time period is greater than the set value, to enable the feedforward control function for the predetermined wind turbine based on the obtained prediction data, and determining whether the predetermined wind turbine is in a full power generation state after the predetermined time period based on the predicted data;
    controlling, in a case the predetermined wind turbine is in the full power generation state, the operation state of the predetermined wind turbine by means of pitch control; and
    controlling, in a case the predetermined wind turbine is in a non-full power generation state, the operation state of the predetermined wind turbine by means of electromagnetic torque control.

2. The enabling method of feedforward control according to claim 1, wherein determining whether to enable the feedforward control function for the predetermined wind turbine based on the obtained prediction data comprises:
    determining whether a prediction accuracy of the predetermined prediction model meets a requirement; and
    determining to enable the feedforward control function for the predetermined wind turbine in a case that the prediction accuracy of the predetermined prediction model meets the requirement.

3. The enabling method of feedforward control according to claim 2, wherein determining whether the prediction accuracy of the predetermined prediction model meets the requirement comprises:
    determining whether a plurality of prediction data in a predetermined sampling period is consistent with a plurality of actually measured data respectively corresponding to the plurality of prediction data; and
    determining, in a case that the plurality of prediction data is consistent with the plurality of actually measured data, that the prediction accuracy of the predetermined prediction model meets the requirement.

4. The enabling method of feedforward control according to claim 3, wherein determining whether the plurality of prediction data in the predetermined sampling period is consistent with the plurality of actually measured data respectively corresponding to the plurality of prediction data comprises:
    calculating a mean absolute error or a mean absolute error percentage between the plurality of prediction data in the predetermined sampling period and the plurality of actually measured data respectively corresponding to the plurality of prediction data; and
    determining, in a case that the mean absolute error is greater than a set threshold corresponding to the predetermined prediction model or the mean absolute error percentage is greater than a set percentage threshold corresponding to the predetermined prediction model, that the plurality of prediction data is consistent with the corresponding plurality of actually measured data.

5. The enabling method of feedforward control according to claim 1, wherein the predetermined prediction model comprises at least one of the following models: a wind speed prediction model, a wind direction prediction model, a turbulence intensity prediction model, and a power generator rotation speed prediction model.

6. The enabling method of feedforward control according to claim 5, wherein in a case that the predetermined prediction model comprises at least two prediction models, the feedforward control method further comprises:
    determining whether a comprehensive accuracy of the at least two prediction models meets a requirement; and
    determining to enable the feedforward control function for the predetermined wind turbine in a case that the comprehensive accuracy of the at least two prediction models meets the requirement.

7. The enabling method of feedforward control according to claim 6, wherein determining whether the comprehensive accuracy of the at least two prediction models meets the requirement comprises:
    setting a weight for each of the at least two prediction models;
    determining the comprehensive accuracy based on the set weight and a prediction accuracy of each of the prediction models; and
    determining that the comprehensive accuracy meets the requirement in a case that the comprehensive accuracy is greater than a preset threshold, or determining that the comprehensive accuracy meets the requirement in a case that the prediction accuracy of each of the prediction models meets the requirement.

8. The enabling method of feedforward control according to claim 1, wherein prediction data after a predetermined time period is obtained by the predetermined prediction model, and the predetermined time period is a predetermined multiple of a minimum time period required to control the predetermined wind turbine to perform an operation corresponding to the predetermined means of feedforward control.

9. A non-transitory computer readable storage medium storing a computer program, wherein the computer program, when executed by a processor, configures the processor to perform the enabling method of feedforward control for a wind turbine in a wind farm according to claim 1.

10. A wind farm group controller, comprising:
a processor; and
a memory storing a computer program, wherein the computer program, when executed by a processor, configures the processor to perform the enabling method of feedforward control for a wind turbine in a wind farm according to claim 1.

11. An enabling device of feedforward control for a wind turbine in a wind farm, wherein the feedforward control device is a wind farm controller comprising:
a data obtaining module, configured to obtain real-time operation data of a predetermined wind turbine in the wind farm;
a prediction module, configured to input the obtained real-time operation data into a predetermined prediction model corresponding to the predetermined wind turbine to obtain prediction data by the predetermined prediction model; and
a feedforward control module, configured to determine whether to enable a feedforward control function for the predetermined wind turbine based on the obtained prediction data to control an operation state of the predetermined wind turbine by predetermined means of feedforward control, wherein the feedforward control module is configured to:
determine whether a change amount of the prediction data in a predetermined time period is greater than a set value; and
determine to enable the feedforward control function for the predetermined wind turbine in a case that the change amount of the prediction data in the predetermined time period is greater than the set value, and determine whether the predetermined wind turbine is in a full power generation state after the predetermined time period based on the predicted data;
control, in a case the predetermined wind turbine is in the full power generation state, the operation state of the predetermined wind turbine by means of pitch control; and
control, in a case the predetermined wind turbine is in a non-full power generation state, the operation state of the predetermined wind turbine by means of electromagnetic torque control.

12. The enabling device of feedforward control according to claim 11, further comprising a test module, configured to determine whether a prediction accuracy of the predetermined prediction model meets a requirement, wherein
in a case that the prediction accuracy of the predetermined prediction model meets the requirement, the feedforward control module is configured to determine to enable the feedforward control function for the predetermined wind turbine.

13. The enabling device of feedforward control according to claim 12, wherein the test module is configured to:
determine whether a plurality of prediction data in a predetermined sampling period is consistent with a plurality of actually measured data respectively corresponding to the plurality of prediction data; and
determine, in a case that the plurality of prediction data is consistent with the plurality of actually measured data, that the prediction accuracy of the predetermined prediction model meets the requirement.

14. The enabling device of feedforward control according to claim 13, wherein the test module is configured to:
calculate a mean absolute error or a mean absolute error percentage between the plurality of prediction data in the predetermined sampling period and the plurality of actually measured data respectively corresponding to the plurality of prediction data; and
determine, in a case that the mean absolute error is greater than a set threshold corresponding to the predetermined prediction model or the mean absolute error percentage is greater than a set percentage threshold corresponding to the predetermined prediction model, that the plurality of prediction data is consistent with the corresponding plurality of actually measured data.

15. The enabling device of feedforward control according to claim 11, wherein the predetermined prediction model comprises at least one of the following models: a wind speed prediction model, a wind direction prediction model, a turbulence intensity prediction model, and a power generator rotation speed prediction model.

16. The enabling device of feedforward control according to claim 15, further comprising a scheduling module, wherein in a case that the predetermined prediction model comprises at least two prediction models, the scheduling module is configured to determine whether a comprehensive accuracy of the at least two prediction models meets a requirement, and wherein
in a case that the comprehensive accuracy of the at least two prediction models meets the requirement, the feedforward control module is configured to determine to enable the feedforward control function for the predetermined wind turbine.

17. The enabling device of feedforward control according to claim 16, wherein the scheduling module is configured to:
set a weight for each of the at least two prediction models;
determine the comprehensive accuracy based on the set weight and a prediction accuracy of each of the prediction models; and
determine that the comprehensive accuracy meets the requirement in a case that the comprehensive accuracy is greater than a preset threshold, or determine that the comprehensive accuracy meets the requirement in a case that the prediction accuracy of each of the prediction models meets the requirement.

* * * * *